(12) United States Patent
Childers et al.

(10) Patent No.: US 6,454,249 B1
(45) Date of Patent: Sep. 24, 2002

(54) MECHANICALLY TUNED HYDRAULIC ENGINE MOUNT

(75) Inventors: Scott L. Childers, Kettering; John A. Walterbusch, Dayton; James Morgan, Springboro; Thomas A. Baudendistel, Farmersville; Charles J. Cornor, Dayton; Raymond H. Louis, Union; Sanjiv G. Tewani, Lebanon, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/794,502

(22) Filed: Feb. 27, 2001

(51) Int. Cl.⁷ .................................................. F16F 5/00
(52) U.S. Cl. .............................. 267/140.14; 267/140.15
(58) Field of Search ...................... 267/140.12, 140.13, 267/140.14, 140.15; 248/562, 636

(56) References Cited

U.S. PATENT DOCUMENTS 4,681,306 A * 7/1987 Hofmann et al. ...... 267/140.13
4,699,099 A * 10/1987 Arai et al. ............. 267/140.14
4,834,349 A * 5/1989 Arai et al. ............. 267/140.14
4,877,225 A * 10/1989 Noguchi et al. ....... 267/140.14

FOREIGN PATENT DOCUMENTS

JP          4-312231 A  * 11/1992  ............ 267/140.13

* cited by examiner

*Primary Examiner*—Jack Lavinder
*Assistant Examiner*—Thomas J. Williams
(74) *Attorney, Agent, or Firm*—Scott A. McBain

(57) ABSTRACT

A hydraulic engine mount includes an orifice track formed in a partition between an elastomer body and a base member of the mount, the partition being formed by two separable orifice plates. An annular fluid filled tuning chamber is disposed adjacent the orifice track and separated therefrom by a flexible membrane. An actuator is in communication with the tuning chamber for forcing pressure fluid into or out of the chamber to selectively deflect or distend the membrane to modify the cross sectional area of the orifice track and the vibration damping characteristics of the mount.

18 Claims, 3 Drawing Sheets

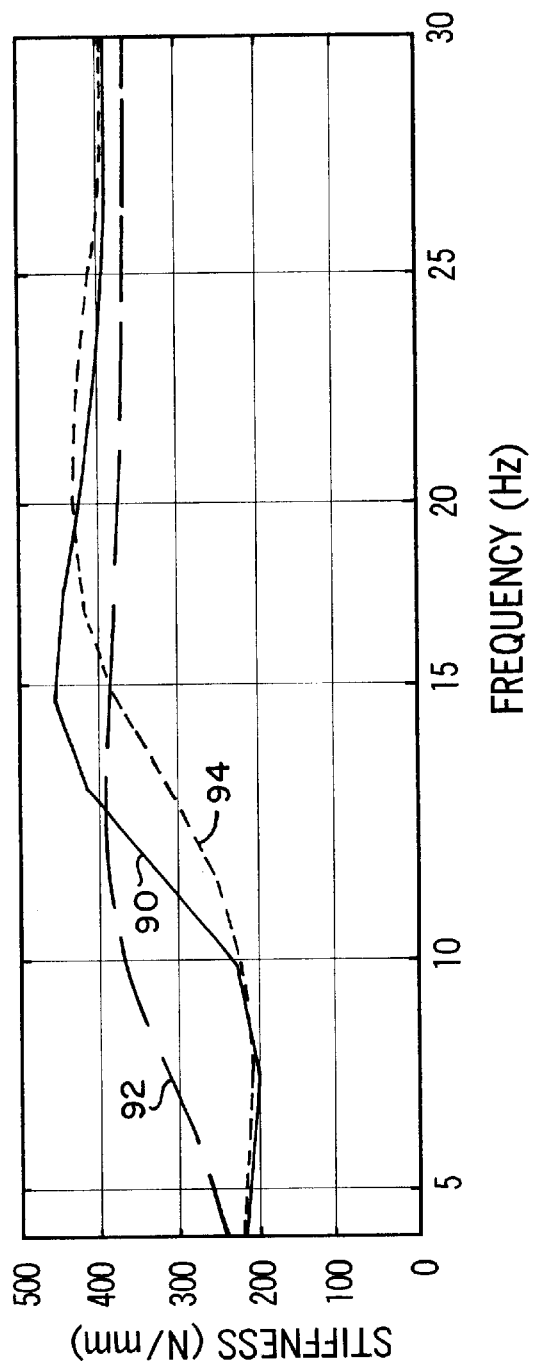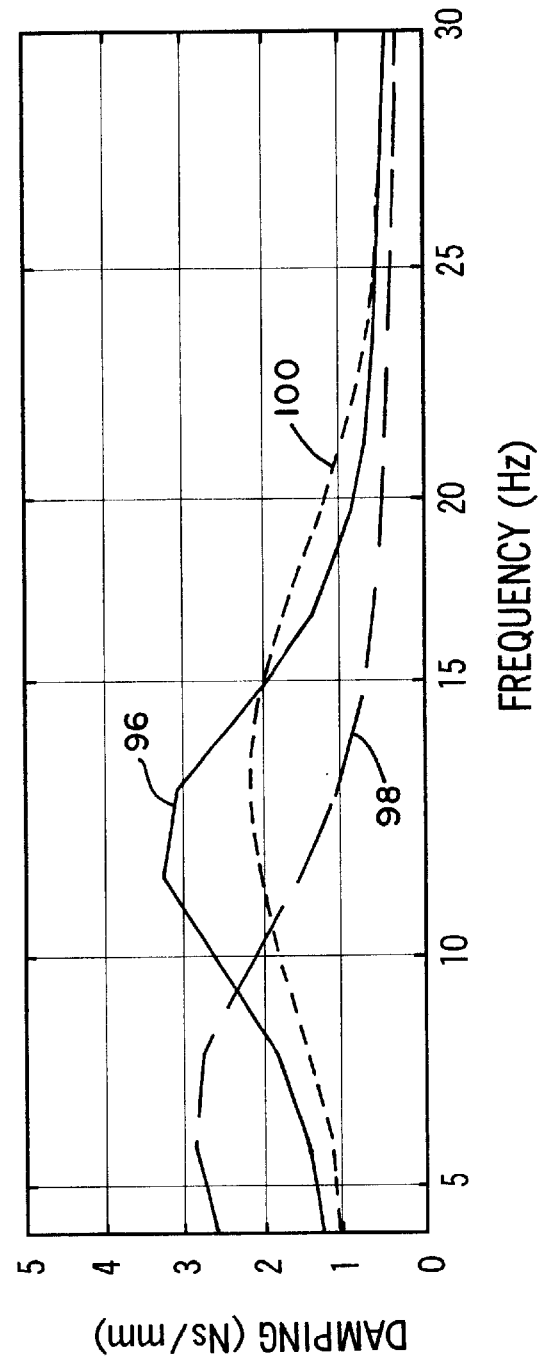

MECHANICALLY TUNED HYDRAULIC ENGINE MOUNT

FIELD OF THE INVENTION

The present invention pertains to a hydraulic vibration isolation mount for automotive vehicle applications, in particular, and including a mechanism for selectively varying the volume of an orifice track between a pumping chamber and a reservoir of the mount to vary the vibration isolation characteristics of the mount.

BACKGROUND

Hydraulic engine and powertrain mounts have been developed which are generally characterized by a partition separating a fluid pumping chamber from a fluid reservoir, the pumping chamber being defined also by an elastomer mount body and the reservoir being delimited by a flexible diaphragm. Dynamic stiffness of the mount is determined by an orifice track formed in the partition for communicating fluid between the pumping chamber and the reservoir. Mounts have also been developed which include a decoupler exposed to fluid in the pumping chamber and/or the reservoir and operable to reduce damping of relatively low amplitude, high frequency vibrations.

In the development of hydraulic engine mounts for various vehicle applications, the ability to "tune" the mount to a particular vehicle without removing it from the vehicle would be particularly useful during the so-called vehicle ride or occupant comfort "tuning" or development phase of the vehicle development. In conventional vehicle ride development for a new vehicle design, for example, it is not unusual to create between ten and twenty specific mount configurations and variations, and swap each of these parts into and out of the vehicle during testing until the proper "tuning" or isolation characteristics of the mount are achieved. Still further, for certain mount applications, it may be desirable to substantially continuously vary the vibration isolation characteristics of the mount.

Accordingly, there is a strong desire to provide an engine or powertrain mount which may be easily adjusted without removing the mount from the vehicle for vehicle development purposes and also for use in applications where a so called active or semi-active mount is needed or desired. It is to these ends that the present invention has been developed.

SUMMARY OF THE INVENTION

The present invention provides an improved engine or powertrain mount of a hydraulic type which may be adjusted or "tuned" over a range of vibration frequencies to improve the damping or isolation characteristics of the mount and without removing the mount from its working position.

In accordance with one aspect of the present invention, a hydraulic engine mount is provided which includes a partition or orifice track assembly characterized by opposed orifice plates, an orifice track formed by one of the plates and a membrane interposed the orifice track and a substantially coextensive annular fluid chamber which may be filled with pressure fluid to deflect the membrane to change the volume and cross sectional area of the orifice track, thereby changing the mount vibration isolation characteristics. The annular chamber is in communication with an actuator for adjusting the volume of fluid in the annular chamber and the distortion or deflection of the membrane. In this way, the volume and cross sectional area of the orifice track may be adjusted to selectively vary the tuning or vibration isolation characteristics of the mount without removing the mount from its working position.

The configuration of the mount of the present invention may be such as to provide a so-called active or semi-active mount for production vehicle applications as well as a mount used for research or development purposes without requiring the construction of a large number of mounts with different fluid flow and vibration damping characteristics and without suffering the time required to assemble and disassemble the mount with respect to the structure supported thereby.

Accordingly, the invention reduces the number of prototype mount test iterations necessary during a mount and engine development project and improved vibration isolation characteristics may be determined through the ability to make direct comparisons of mount performance by selectively adjusting the so called dynamic stiffness of the mount.

Those skilled in the art will further appreciate the above mentioned advantages and superior features of the invention together with other important aspects thereof on reading the detailed description which follows in conjunction with the drawings.

BRIEF DESCRIPTION OF THE DRAWINGS

FIG. 4 is a diagram showing dynamic stiffness verses frequency for the mount shown in FIGS. 1 through 3 for selected cross sectional areas and volumes of the orifice track; and FIG. 5 is a diagram similar to FIG. 4 but indicating the damping characteristics of the mount shown in FIGS. 1 through 3 versus vibration frequency.

DETAILED DESCRIPTION OF A PREFERRED EMBODIMENT

Figure 1:
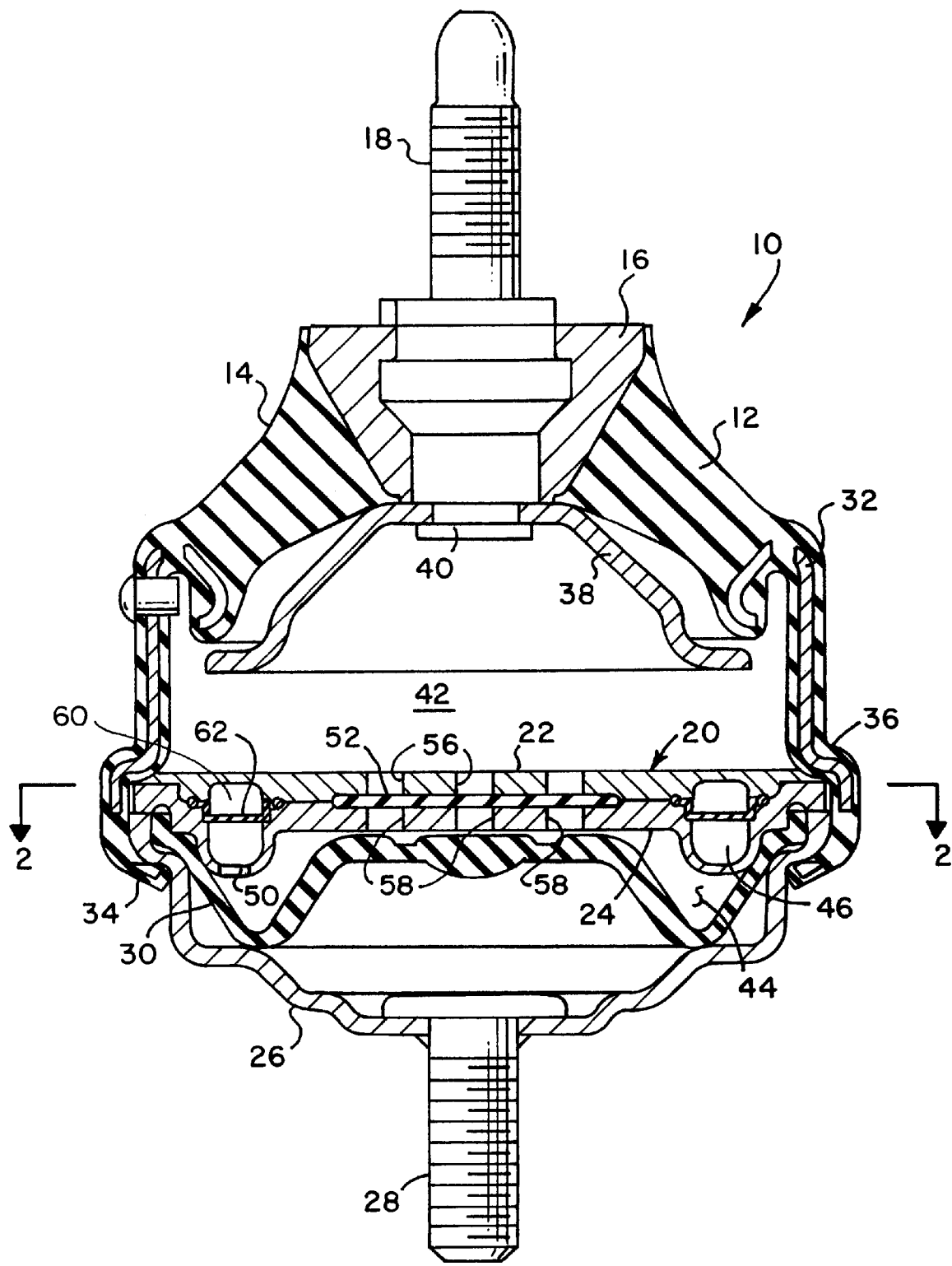
FIG. 1 is a longitudinal central section view of a mechanically tunable hydraulic engine mount in accordance with the invention.

In the description which follows, like parts are marked throughout the specification and drawing with the same reference numerals, respectively. The drawing figures are not necessarily to scale and certain features may be shown in schematic or rather generalized form in the interest of clarity and conciseness.

Referring to FIG. 1, there is illustrated a hydraulic powertrain or engine mount in accordance with the present invention and generally designated by the numeral 10. The mount 10 is characterized by a generally cylindrical elastomer body 12 having a somewhat frustoconical portion 14 encapsulating an insert 16 for an upstanding threaded post mounting member 18. The body 12 is suitably connected to a partition 20 comprising an orifice plate assembly characterized by a generally cylindrical planar upper orifice plate 22 and a cooperating, generally cylindrical planar lower orifice plate 24. A somewhat cylindrical can shaped base member 26 supports a second mounting member 28 and is operable to secure a generally cylindrical flexible elastomer diaphragm 30 to the lower orifice plate 24. The elastomer body 12 includes a metal insert 32 encapsulated in the elastomer of the body and deformable to provide a circumferential inward turned flange 34 and cooperating shoulder 36 between which the partition 20, the diaphragm 30 and the base member 26 are forcibly joined together, as illustrated.

An internal interlock member 38 is secured to the mounting member 18 by a suitable connector 40 and is disposed in a fluid filled pumping chamber 42 formed between the body 12 and the partition 20. A second fluid chamber or reservoir 44 is formed between the diaphragm 40 and the partition 20, as illustrated.

The lower orifice plate 24 is configured to provide a substantially circumferential annular ring shaped passage 46 formed therein and known in the art as an orifice track. The passage 46 opens through a port 48, see FIG. 2, into the pumping chamber 42. A port 50, FIG. 1, opens into the reservoir 44 at a circumferentially spaced point along the annular track 46. Accordingly, when the elastomer body 12 is deflected relative to the partition 20 and the base member 26, hydraulic fluid, such as a mixture of water and ethylene glycol, is pumped between the pumping chamber 42 and the reservoir 44 through the port 48, the orifice track 46 and the port 50. The elongated passage formed by the orifice track 46 provides a certain resistance to flow of fluid between the chamber 42 and the reservoir 44 which affects the dynamic stiffness and vibration isolation or damping characteristics of the mount 10 in a known way.

Figure 2:
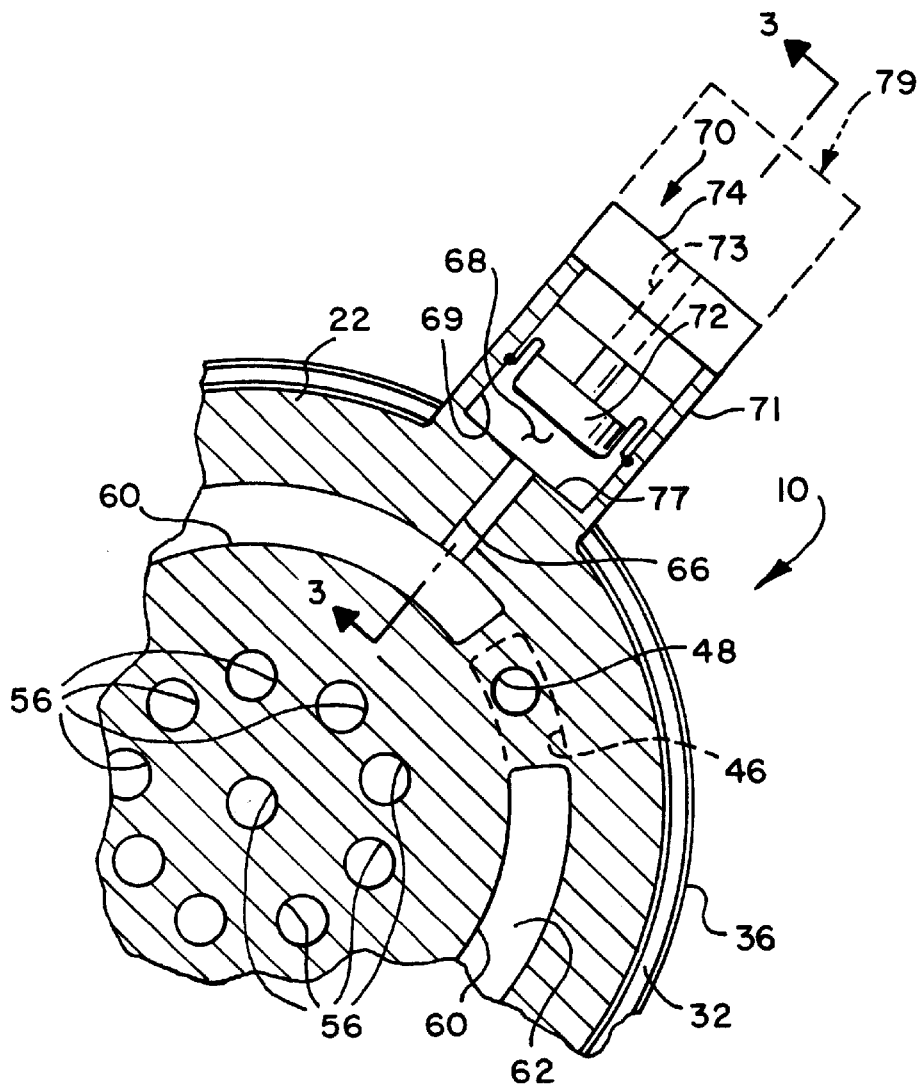
FIG. 2 is a detail section view taken generally from the line 2—2 of FIG. 1.

The partition 20 may also include a flexible elastomer disk shaped decoupler member 52 disposed between the orifice plates 22 and 24 and forming a fluid tight flexible partition which is exposed to pressure fluid in the pumping chamber 42 by way of a series of ports 56, see FIG. 2 also. The reservoir 44 is also exposed to the opposite side of the decoupler member 52 through a series of ports 58, FIG. 1, which may be arranged in a pattern similar to that of the ports 56. The decoupler member 52 is operable to flex upwardly and downwardly in a small clearance space formed between the orifice plates 22 and 24 to damp relatively low amplitude and high frequency vibrations, such as those produced by an idling engine supported by the mount 10.

Figure 3:
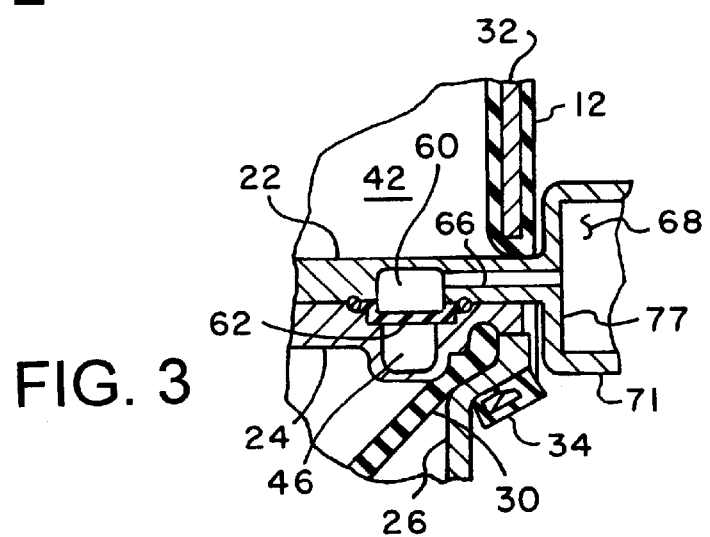
FIG. 3 is a detail section view taken generally from the line 3—3 of FIG. 2.

Referring further to FIGS. 1, 2 and 3, the partition 20 is further characterized by a mount tuning chamber comprising an annular recess 60 which is not entirely circumferential, as shown in FIG. 2. The tuning chamber or recess 60 is isolated from the orifice track 46 by a deformable annular membrane 62 secured between the orifice plates 22 and 24 to form a fluid tight seal so that fluid in the orifice track 46 cannot commingle with fluid in the recess or chamber 60.

As shown in FIGS. 2 and 3, the almost circumferential annular tuning chamber 60 is in communication with a passage 66 opening into a space 68 formed by a syringe type actuator assembly 70 of the mount 10. Actuator assembly 70 includes a cylinder housing 71 which may be formed integral with orifice plate 22, as shown in FIGS. 2 and 3. As shown by way of example, a rolling diaphragm type piston 72 is disposed in a bore 69 in housing 71. Piston 72 delimits the space 68 so that a suitable hydraulic fluid therewithin may be forced to flow into and out of the chamber 60. A suitable actuator 74 is operably connected to the rolling diaphragm piston 72 to move same to selected positions to force fluid into the annular tuning chamber 60 or to allow fluid to flow from chamber 60 into the space 68, depending on the position of the piston 72.

For example, if the piston 72 is moved toward a transverse end wall 77 of the actuator assembly 70, fluid is displaced into the tuning chamber 60 and distends the membrane 62 into the orifice track 46 thereby reducing the volume of the track and its cross sectional area. Conversely, if the piston 72 is retracted away from wall 77, the resilient nature of the membrane 60 will cause it to relax and retract thereby increasing the cross sectional area and volume of the orifice track 46. In this way, the actuator assembly 70 may be adjusted to vary the cross sectional area and volume of the orifice track 46 and the vibration isolation characteristics of the mount 10.

The cross sectional area of the orifice track 46 is thus operable to be selectively varied. A reduced cross sectional area orifice track 46 will present a reduced frequency of resonance of the fluid between the pumping chamber 42 and the reservoir 44 thereby increasing the dynamic stiffness of the mount 10 at lower vibration frequencies. Conversely, by increasing the cross sectional area of the orifice track 46 by allowing fluid to flow out of chamber 60 and into the actuator space 68, the membrane 62 may be displaced upwardly, viewing FIG. 1, increasing the cross sectional area and volume of the orifice track 46 and a higher resonance frequency of fluid between the pumping chamber 42 and the reservoir 44 thereby increasing the dynamic stiffness of the mount 10 at higher vibration frequencies.

The actuator assembly 70 may be manual or remotely controllable. For example, the actuator member 74 may be suitably secured on the actuator housing 71 for rotation relative thereto and the piston 72 may include a suitable threaded piston rod 73 cooperable with the actuator member 74 and responsive to rotation thereof to move the piston 72 axially within the space 68 toward and away from the end wall 77. A remotely controllable electric and/or hydraulic actuator 79, FIG. 2, may be operably connected to the actuator member 74 or directly to the piston 72 to selectively position the piston and the amount of fluid forced into the tuning chamber 60, and thus the distortion of the membrane 62.

Referring now to FIG. 4, there is illustrated a diagram indicating the change in dynamic stiffness exhibited by the mount 10 for selected frequencies as a consequence of increasing and decreasing the volume and cross sectional area of the orifice track 46. The curve 90 is a baseline curve whereas the curve 92 illustrates the dynamic stiffness characteristics of the mount 10 at selected frequencies for an increased cross sectional area of the orifice track 46 than presented by the baseline curve. Curve 94 indicates the dynamic stiffness of the mount 10 for a reduced cross sectional and volume of orifice track 46.

In like manner, the vibration damping characteristics of the mount 10 are shown in FIG. 5 wherein curve 96 is the baseline curve and curves 98 and 100 illustrate the vibration damping capability of the mount 10 for increased volume and cross sectional area and reduced volume and cross sectional area for orifice track 46, respectively. Thus, it will be appreciated from the data illustrated in FIGS. 4 and 5 that the vibration isolation or damping characteristics of the mount 10 may be modified by modifying the fluid volume and cross sectional area of the passage forming the orifice track 46 by suitable distortion of the membrane 62 in the manner described above.

The construction and operation of the mount 10 is believed to be understandable to those of ordinary skill in the art based on the foregoing description. Although a preferred embodiment of a tunable hydraulic mount in accordance with the invention has been described in detail herein, those skilled in the art will further appreciate that the mount 10 may be modified in selected ways without departing from the scope and spirit of the appended claims.

What is claimed is:

1. A hydraulic mount for an operating component of a vehicle comprising:
   first and second mounting members;
   a body connected to one of said mounting members and a base connected to the other of said mounting members;
   a partition interposed said body and said base and including an orifice track formed therein, said partition comprising first and second orifice plates disposed adjacent each other, one of said orifice plates defining at least in part said orifice track and the other of said orifice plates including an elongated fluid filled tuning chamber formed therein;
   a fluid pumping chamber formed between said body and said partition and a fluid reservoir formed between said partition and a member interposed said partition and said base;
   fluid flow ports communicating said orifice track with said pumping chamber and said reservoir, respectively; and
   a member operable to change the cross sectional area of said orifice track to selectively vary the vibration damping characteristics of said mount.

2. The mount set forth in claim 1 wherein:
   said member operable to change the cross sectional area of said orifice track is interposed said tuning chamber and said orifice track.

3. The mount set forth in claim 2 wherein:
   said member operable to change the cross sectional area of said orifice track comprises a membrane deflectable to selectively vary the effective cross sectional area of said orifice track.

4. The mount set forth in claim 3 including:
   an actuator for controlling fluid admitted to said tuning chamber to control the deflection of said membrane.

5. The mount set forth in claim 4 wherein:
   said actuator includes a piston and cylinder in fluid flow communication with said mount for displacing fluid into and from said tuning chamber.

6. The mount set forth in claim 5 wherein:
   said actuator includes a manually rotatable member for moving said piston in said cylinder.

7. The mount set forth in claim 5 wherein:
   said actuator comprises one of a remotely controllable electric or hydraulic actuator.

8. The mount set forth in claim 4 wherein:
   said actuator is connected to one of said orifice plates.

9. A hydraulic mount for an operating component of a vehicle comprising:
   first and second mounting members;
   a body connected to one of said mounting members and a base connected to the other of said mounting members;
   a partition interposed said body and said base and including an orifice track formed therein, said partition comprising first and second orifice plates disposed adjacent each other, one of said orifice plates defining at least in part said orifice track;
   a fluid pumping chamber formed between said body and said partition and a fluid reservoir formed between said partition and a member interposed said partition and said base;
   fluid flow ports communicating said orifice track with said pumping chamber and said reservoir, respectively;
   a member operable to change the cross sectional area of said orifice track to selectively vary the vibration damping characteristics of said mount; and
   a decoupler interposed said orifice plates and operable to react fluid in at least one of said pumping chamber and said reservoir through ports communicating fluid between one of said reservoir and said pumping chamber with said decoupler.

10. A hydraulic mount for an operating component of a vehicle comprising:
    a body;
    a base member;
    a partition interposed said body and said base member and including an orifice track formed therein, said partition comprising first and second orifice plates disposed adjacent each other, one of said orifice plates defining at least in part said orifice track and the other of said orifice plates including an elongated fluid filled mount tuning chamber formed therein;
    a fluid pumping chamber formed between said body and said partition and a fluid reservoir formed between said partition and said base member;
    fluid flow ports communicating said orifice track with said pumping chamber and said reservoir, respectively; and
    a membrane interposed said orifice track and said tuning chamber and operable to change the cross sectional area of said orifice track to vary the volume of fluid between said pumping chamber and said reservoir to selectively vary the vibration damping characteristics of said mount.

11. The mount set forth in claim 10 including:
    an actuator for controlling fluid admitted to said tuning chamber to vary deflection of said membrane.

12. The mount set forth in claim 11 wherein:
    said actuator includes a piston and cylinder in fluid flow communication with said mount for displacing fluid into and from said tuning chamber.

13. The mount set forth in claim 12 wherein:
    said actuator includes a manually movable member for moving said piston in said cylinder.

14. The mount set forth in claim 12 wherein:
    said actuator comprises one of a remotely controllable electric or hydraulic actuator.

15. The mount set forth in claim 11 wherein:
    said actuator is connected to one of said orifice plates.

16. A hydraulic mount for an operating component of a vehicle comprising:
    a body;
    a base member;
    a partition interposed said body and said base member and defining at least in part an orifice track and an elongated fluid filled mount tuning chamber formed therein;
    a fluid pumping chamber formed between said body and said partition and a fluid reservoir formed between said partition and said base member;
    fluid flow ports communicating said orifice track with said pumping chamber and said reservoir, respectively;
    a membrane interposed said orifice track and said tuning chamber and operable to be deflected to change the cross sectional area of said orifice track to vary the volume of fluid between said pumping chamber and said reservoir to selectively vary the vibration damping characteristics of said mount; and an actuator for controlling fluid admitted to said tuning chamber to vary deflection of said membrane.

17. The mount set forth in claim 16 wherein:

said actuator includes a piston and cylinder in fluid flow communication with said mount for displacing fluid into and from said tuning chamber.

18. The mount set forth in claim 17 wherein:

said actuator comprises one of a manually movable member for moving said piston in said cylinder and a remotely controllable electric or hydraulic actuator.

* * * * *